United States Patent [19]

Sogabe et al.

[11] Patent Number: 5,395,694
[45] Date of Patent: Mar. 7, 1995

[54] ALUMINUM NITRIDE POWDER HAVING SURFACE LAYER CONTAINING OXYNITRIDE

[75] Inventors: Kouichi Sogabe; Takahiro Matsuura; Seiji Nakahata; Akira Yamakawa, all of Itami, Japan

[73] Assignee: Sumitomo Electric Industries, Ltd., Japan

[21] Appl. No.: 117,433

[22] Filed: Sep. 7, 1993

[30] Foreign Application Priority Data

Sep. 21, 1992 [JP] Japan ................... 4-276608

[51] Int. Cl.$^6$ ............................................. B32B 15/04
[52] U.S. Cl. ................... 428/404; 428/336; 428/402; 428/403; 428/688; 428/689; 428/697; 428/698; 428/699; 428/701; 428/702; 428/704; 501/96
[58] Field of Search ............ 428/336, 402, 688, 689, 428/697, 698, 699, 701, 702, 404, 403, 704; 501/96, 98, 100

[56] References Cited

U.S. PATENT DOCUMENTS

| | | | |
|---|---|---|---|
| 5,034,357 | 7/1991 | Yamakawa | 501/96 |
| 5,116,791 | 5/1992 | Mignani | 501/96 |
| 5,147,832 | 9/1992 | Shimoda | 501/96 |
| 5,246,683 | 9/1993 | Parent | 501/96 |

FOREIGN PATENT DOCUMENTS

| | | |
|---|---|---|
| 472776 | 3/1992 | European Pat. Off. . |
| 487728 | 6/1992 | European Pat. Off. . |
| 54980 | 3/1985 | Japan . |
| 34566 | 2/1990 | Japan . |
| 66159 | 3/1990 | Japan . |
| 69306 | 3/1990 | Japan . |
| 120214 | 5/1990 | Japan . |
| 53831 | 8/1992 | Japan ................... C04B 35/58 |
| 164710 | 6/1993 | Japan ................... C01B 21/072 |

Primary Examiner—Ellis P. Robinson
Assistant Examiner—Timothy M. Speer
Attorney, Agent, or Firm—Jordan B. Bierman

[57] ABSTRACT

An aluminum nitride powder having a surface layer containing an oxynitride characterized in that the surface layer of the aluminum nitride particle contains an aluminum oxynitride which has an oxygen content of 5 to 75 mol % in terms of $Al_2O_3/(Al_2O_3+AlN)$. The surface layer of the aluminum nitride powder may contain, besides the aluminum oxynitride, at least one other oxynitride selected from among oxynitrides of Mg, Ca, Ba, Ti, V, Cr, Co, Ni, Cu, Ga, Ge, Zr, Nb, Mo, Ru, Hf, Ta, W, Li, B, Si, Y, Sc and rare metal elements and the aluminum oxynitride and at least one other oxynitride have a total oxygen content in the range of 10 to 75 mol % in terms of (3×oxygen amount)/(3×oxygen amount+nitrogen amount). The alumina nitride powder can easily be converted into a sintered body having excellent sinterability and favorable characteristics, since the above surface layer reduces the penetration of oxygen from the surface layer into the crystal grains and prevents the formation of microcracks layer.

8 Claims, 2 Drawing Sheets

ALUMINUM NITRIDE POWDER HAVING SURFACE LAYER CONTAINING OXYNITRIDE

BACKGROUND OF THE INVENTION

1. Field of the Invention

The present invention relates to an aluminum nitride powder to be used for the production of aluminum nitride sintered body.

2. Description of the Prior Art

The surfaces of the particles of an aluminum nitride powder have heretofore been composed of aluminum oxide boehmite (AlOOH) and/or aluminum hydroxide (Ai(OH)$_3$) formed by the reaction with the moisture in the air. In the case of the powder produced by the reductive nitriding method in which decarbonizing is effected in an atmosphere containing oxygen gas in order to remove excess carbon at the time of production, the surfaces of the particles have been composed of an aluminum oxide (Al$_2$O$_3$) formed in the decarbonizing step. A number of cracks has been caused on the surface layer thereof due to the difference in thermal expansion coefficient between aluminum nitride and aluminum oxide, boehmite and/or aluminum hydroxide, or due to milling of the aluminum nitride powder.

Accordingly, with regard to the conventional aluminum nitride powder, there has been observed a phenomenon that reaction takes place between the oxygen in the surface layer, which is composed of aluminum oxide, boehmite and/or aluminum hydroxide, and the aluminum nitride inside the particles due to the heating accompanying sintering, causing an increase in the amount of oxygen in solid solution inside aluminum nitride crystals and an decrease in the amount of oxygen in the surface layer at the same time. As a result, the conventional aluminum nitride has brought about the problems that the resultant aluminum nitride sintered body is lowered in thermal conductivity and changed in color tone, and pores are formed in the grain boundary region by the decrease in a liquid phase amount and nonuniform distribution thereof which accompany the decrease in the amount of oxygen in the surface layer.

An aluminum nitride powder reduced in oxygen content to attain a high thermal conductivity has problems that the thickness and distribution of the surface layer are made nonuniform and, therefore, when the powder is allowed to stand at room temperature in the atmosphere, moisture and oxygen in the atmosphere penetrate through the microcracks at the time of heating or with the elapse of time, thus causing an increase in the amount of oxygen and finally an increase in the amount of oxygen in solid solution inside the grains of aluminum nitride (AlN).

SUMMARY OF THE INVENTION

Under these circumstances, an object of the present invention is to provide an aluminum nitride powder capable of easily being converted into a sintered body having excellent sinterability and favorable characteristics by decreasing the amount of oxygen which penetrates from the surface layer into the AlN crystal grain inside to form a solid solution at the time of heating, and eliminating the formation of microcracks due to the difference in thermal expansion coefficient between the surface layer and the inside to suppress the increase in the amount of oxygen.

In order to achieve the above-mentioned object, the aluminum nitride powder according to the present invention is characterized in that the surface layer of the aluminum nitride powder contains an aluminum oxynitride which has an oxygen content of 5 to 75 mol % in terms of Al$_2$O$_3$/(Al$_2$O$_3$+AlN).

The surface layer of the aluminum nitride powder according to the present invention may contain at least one selected from the group consisting of oxynitrides of Mg, Ca, Ba, Ti, V, Cr, Co, Ni, Cu, Ga, Ge, Zr, Nb, Mo, Ru, Hf, Ta, W, Li, B, Si, Y, Sc and a rare metal element in addition to an aluminum oxynitride. In such a case, the powder is characterized in that the aluminum oxynitride and the above-mentioned other oxynitrides have a total oxygen content in the range of 10 to 75 mol % in terms of (3×oxygen amount)/(3×oxygen amount+nitrogen amount).

DETAILED DESCRIPTION OF THE PREFERRED EMBODIMENTS

Figure 1:
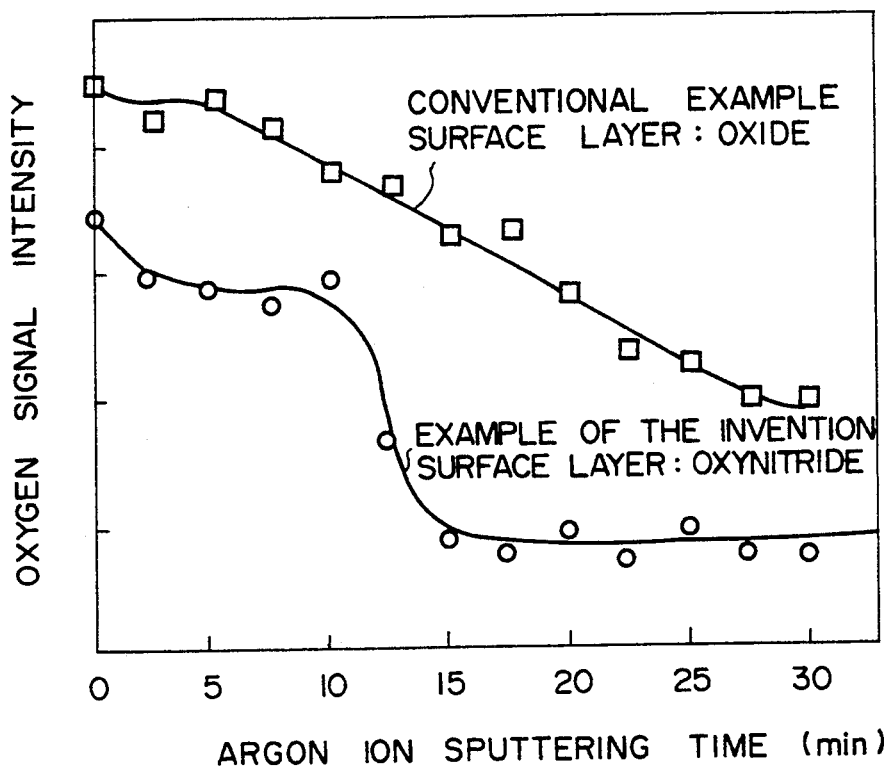
FIG. 1 is a graph showing the oxygen concentration distribution in the depth direction as determined by SIMS (secondary ion mass spectroscopy) for both the conventional AlN powder having a surface layer composed of an oxide and the AlN powder having a surface layer composed of an oxynitride according to the present invention, both powders having been heated at 1800° C. for 1 hour in pure N$_2$ gas.

Since the surface layer of the aluminum nitride (AlN) powder according to the present invention consists of or contains an aluminum oxynitride, the amount of oxygen which penetrates into the crystal grain inside to form a solid solution is markedly reduced by the decrease in the diffusion coefficient of oxygen or the amount of oxygen in the surface layer. FIG. 1 gives oxygen concentration distribution in the direction of depth for both the conventional AlN powder whose surface layer is composed of the oxide and the AlN powder of the present invention whose surface layer is composed of the oxynitride. The analysis was made by SIMS (secondary ion mass spectrometry) for the molding with a reduced beam diameter, subsequently a correction was made for the average grain size assuming the grains to be spherical, and the oxygen concentration distribution per grain was expressed. As can be seen from the result shown in FIG. 1, the AlN powder of the present invention having the surface layer composed of the oxynitride is markedly reduced in the amount of oxygen in solid solution, thus making it possible to fix oxygen in only the surface layer even when the powder is heated for sintering.

In the case of producing an AlN sintered body with a high thermal conductivity, the amount of oxygen in solid solution inside the crystal grain of AlN powder as the starting material is desirably 0.2% by weight or less. Such a desirable amount can be attained by the present invention, thus making it possible to prevent the decrease in the thermal conductivity of the AlN sintered body by using the AlN powder of the present invention as the starting material. It is also possible to control the thermal conductivity of the AlN sintered body with high accuracy, since the amount of oxygen which penetrates from the surface layer into the crystal grain inside to form a solid solution is reduced and the amount of the oxygen in solid solution is defined by the compositional ratio of the oxygen to the nitrogen in the surface layer.

In addition, since the oxynitride in the surface layer is chemically stabilized and the amount of oxygen in solid solution in the crystal grain inside is reduced, the formation of the liquid phase at the time of sintering is stabilized, the formation of the pores in the grain boundary is suppressed and besides, it is made possible to prevent the change in the color tone of the sintered body. In particular, an alkaline earth element or a rare earth element, when contained in the surface layer, lowers the melting point of the liquid phase to be formed by 50° C. or more, thus further improving the sinterability.

The suppression of the amount of oxygen in solid solution caused by the penetration of oxygen from the surface layer into the crystal grain inside is effective when the oxygen content in the aluminum oxynitride of the surface layer ranges from 5 to 75 mol % in terms of $Al_2O_3/(Al_2O_3+AlN)$. Specifically, a content thereof less than 5 mol % results in an increase in oxygen amount when the powder is allowed to stand in the atmosphere because of high reactivity with the moisture in the atmosphere, whereas a content thereof more than 75 mol % leads to an increase in the amount of oxygen in solid solution by the penetration of oxygen from the surface layer into the crystal grain inside to 0.15% or more by weight. A content thereof in the range of 10 to 70 mol % is particularly desirable, since the amount of the oxygen in solid solution by the penetration of oxygen from the surface layer into the crystal grain inside can be suppressed to 0.1% or less by weight.

Moreover, according to the composition of the objective sintered body in the present invention, the surface layer of the AlN powder may contain at least one other oxynitride selected from the group consisting of oxynitrides of Mg, Ca, Ba, Ti, V, Cr, Co, Ni, Cu, Ga, Ge, Zr, Nb, Mo, Ru, Hf, Ta, W, Li, B, Si, Y, Sc and a rare earth element. It is necessary in such a case that the aluminum oxynitride and other oxynitrides have an oxygen content, in total, of 10 to 75 mol % in terms of ($3 \times$ oxygen amount)/($3 \times$ oxygen amount + nitrogen amount) in order to attain the above-mentioned effect on the suppression of the amount of oxygen in solid solution.

Since the surface layer of the AlN powder of the present invention contains the aluminum oxynitride and other oxynitride, the thermal expansion coefficient of the surface layer comes close to that of the AlN inside the grains. As a result, a surface layer thickness of 100 Å or less can prevent the formation of microcracks, thereby enhancing the protective function against the moisture in the atmosphere and suppressing the increase in the oxygen content with the elapse of time to one half or less of the conventional value. Moreover, a surface layer thickness of 10 Å or more, preferably 20 Å or more, can suppress the increase in the oxygen amount to 0.2% by weight or less even when the powder has been subjected to mixing using water as solvent and, thus, enables mixing and molding with the use of water as solvent.

The surface layer of the AlN powder can be identified by infrared absorption spectroscopy (FTIR). When an oxynitride is contained in the powder, an absorption appears at 680 to 710 $cm^{-1}$. The surface layer thickness can be determined with a transmission electron microscope, by secondary ion mass spectrometry (SIMS) capable of analysis in the depth direction or by electron spectroscopy for analysis (ESCA). The oxygen amount in the AlN powder crystal grain can be determined by the change in the number of unpaired electrons measured by the electron spin resonance (ESR) method.

Since the surface layer of the AlN powder according to the present invention contains an oxynitride, the diffusion coefficient of the oxygen which diffuses from the surface layer into the AlN powder crystal grain is lower than that in the conventional AlN powder. The diffusion coefficient D ($cm^2/s$) of oxygen atom as determined by electron spin resonance (ESR) is not higher than $8.0 \times 10^{-9} \times \exp(-69100(cal/mol)/R \cdot T)$. The measurement of the diffusion coefficient was made according to the following method.

(1) Procedure for measuring diffusion coefficient

Powder as a starting material and those maintained at 1500° C., 1700° C. and 1900° C., respectively, for 1 hour were press molded into test pieces with 16.6 mm length, 16.6 mm width and 2.5 mm height at a molding density of 1.8 to 1.9 $g/cm^3$ using camphor (8% by weight) so as to attain the conditions close to those for sintering. The number of unpaired electrons of each of the test pieces was measured by the electron spin resonance (ESR) method and was converted to the amount of oxygen in solid solution. The oxygen amount in the surface layer was determined by subtracting the above amount in solid solution from the oxygen amount obtained by gas analysis and dividing the difference by the specific surface area.

(2) Calculation of diffusion coefficient (D)

Because of the necessity for measuring the change with the time, analysis was made by approximate solution under the condition of a short diffusion time ($\sqrt{2Dt} \ll 1$) using a infinite flat plate. The parameters necessary for the calculation are as follows:

$\alpha = nt/ns$,
where nt: amount of oxygen in the surface layer of AlN powder
ns: amount of oxygen inside AlN powder
Mt: increment of oxygen inside AlN powder = amount of oxygen in solid solution at each temperature - amount of oxygen in solid solution in starting powder
$M\infty$: amount of oxygen in solid solution after the elapse of infinite time = total oxygen amount - amount of oxygen in solid solution in starting powder.
L: Thickness of test pieces: (volume of 1 g AlN/specific surface area of 1 g AlN) $\times \frac{1}{2}$
t: heating time (sec)

The relation between Mt and $M\infty$ is as follows:

$$Mt/M\infty = (1+\alpha)\{1 - eerf[\sqrt{(Dt/L^2)}/\alpha]\}, \text{ thus} \quad \text{[Equation 1]}$$

$$eerf[\sqrt{(Dt/L^2)}/\alpha] = 1 - Mt/(1+\alpha)M\infty \quad \text{[Equation 2]}$$

where
$\sqrt{(Dt/L^2)}/\alpha$ means $(Dt/L^2)^{\frac{1}{2}}/\alpha$.
The error correction function is as follows:

$$eerf(X) = exp(X^2) \times eerf(X) \quad \text{[Equation 3]}$$

The diffusion coefficient is calculated by substituting the results of measurement for Mt; $M\infty$ and $\alpha$ in the above equation 2 and X expressed by the following equation 4 is calculated by using the error correction function table.

$$X = \sqrt{(Dt/L^2)/\alpha} \qquad \text{[Equation 4]}$$

The diffusion coefficient D at respective temperatures can be obtained by substituting L, t and α in Equation 4.

$$D = D_0 \times exp(-H/RT) \qquad \text{[Equation 5]}$$

where T: heating temperature in K. $D_0$ (frequency factor) and H (diffusion enthalpy) are obtained by taking common logarithm for both sides and applying the method of least squares to 1/T.

Next, the process for producing the AlN powder having a surface layer containing an oxynitride according to the present invention will be described. In the case of AlN powder immediately after synthesis out of contact with the atmosphere, that is, without surface layer, a surface layer containing an oxynitride can be formed by bringing the AlN powder into contact with carbon dioxide or a mixed gas of a carbon source supplied in gas phase, such as methane, and carbon dioxide each at 500° C. or higher. In particular, when a carbon source coexists as a reducing agent, oxidation by carbon dioxide and reduction take place simultaneously, thus facilitating the formation of a surface layer containing an oxynitride.

In the case of a commercially available AlN powder having a surface layer containing an oxide or the like, it is desirable to adopt a method wherein the powder is heated in an atmosphere of nitrogen or ammonia gas in the presence of a reducing agent such as carbon or a metal, e.g. calcium. It is also possible to remove the existing surface layer and then form a new surface layer containing an oxynitride. For example, a commercially available AlN powder may be heated in chlorine gas for etching the oxide in the surface layer and then heated in an atmosphere of humidified ammonia gas.

The above-mentioned methods are applicable to the powder, which has been incorporated with Mg, Ca, Ba, Ti, V, Cr, Co, Ni, Cu, Ga, Ge, Zr, Nb, Mo, Ru, Hf, Ta, W, Li, B, Si, Y, Sc and/or a rare earth element at the time of or after the synthesis of AlN powder, to form the oxynitride layer containing the aforesaid elements. The AlN powder after synthesis may be incorporated with inorganic or organic compounds containing the aforesaid metallic element(s) in place of such metallic element or elements. It is desirable to adopt a method for enhancing the proportion thereof on the AlN surface (AlN surface covering ratio), such as a method wherein an organometallic compound in solution form is applied to the powder, electroless deposition of the metallic element, or the use of a powder of 5,000 Å or smaller in particle diameter. In particular, in the case of the additive element or compound which forms a nitride at a relatively low temperature (for example, Ti, $TiO_2$ and TiC which can be converted into TiN at 1350° to 1400° C.), the reaction product is nitrided along with the reaction between the additive and the surface oxide layer. Thus, the above method is more effective than the method in which aluminum oxide or boehmite alone is reformed into an oxynitride.

It is possible to form the surface layer containing an oxynitride by subjecting the AlN powder, incorporated with the element, to nitrogen ion implantation, heating with electron beams, heating with microwave, or high-frequency induction heating, since the diffusion coefficient in aluminum oxide for each element is higher than that in aluminum nitride and thus the oxide existing in the surface layer is converted into an oxynitride. In particular, heating in nitrogen plasma is desirable because it can form the surface layer without raising the temperature of the AlN powder particles and suppress the formation of oxygen solid solution.

In the case of forming an oxynitride on a commercially available AlN powder having an oxide layer by partially reducing it with carbon, the reducing reaction is made nonuniform by the carbon distribution, thus making it impossible to perfectly prevent oxygen from diffusing inside the AlN crystal grain. Therefore, in order to convert the oxide surface layer of the commercially available AlN powder into the uniform surface layer of the oxynitride according to the present invention, it is necessary to take into consideration the reaction conditions and facilities as will be described hereunder.

(1) It is desirable to use, in combination, Mg, Ca, Ba, Ti, V, Cr, Co, Ni, Cu, Ga, Ge, Zr, Nb, Mo, Ru, Hf, Ta, W, Li, B, Si, Y, Sc or a compound of a rare earth element.

(2) The reaction temperature should be set at 1600° C. or lower, desirably 1500° C. or lower, since reducing reaction by carbon and solid-dissolution of oxygen into AlN crystal grain may simultaneously proceed at a temperature higher than 1600° C.

(3) The amount of oxygen in solid solution inside the grain of the commercially available AlN powder should be at most 0.2% by weight, since the dissolution oxygen in solid solution partially occurs.

(4) In a resistance heating furnace, if used, at least 1 hour of heating is required to effect reaction.

(5) Heating with infrared ray or microwave and high-frequency induction heating are desirable because uniform quick heating is possible.

EXAMPLE 1

An amorphous AlN powder produced by pyrolyzing an alkylaluminum in $NH_3$ was heated to 1500° to 1700° C. in nitrogen gas without bringing the powder into contact with the atmosphere to grow the grains up to 0.3 to 0.8 μm in average particle diameter. Each resultant AlN powder was heated to 600° C. in a mixed gas of $CH_4$ and $CO_2$ without bringing the powder into contact with the atmosphere to form an aluminum oxynitride surface layer on the powder surface.

As the result of analysis by ESCA for each of the obtained AlN powders, the proportion $Al_2O_3/(Al_2O_3+AlN)$ in the aluminum oxynitride of the surface layer was confirmed to be 5 to 75 mol %. The increment of oxygen in solid solution inside the AlN crystal grains was determined by ESR according to the above-described procedure (refer to the entitled "(1) Procedure for measuring diffusion coefficient") and given in Table 1 along with the position of absorption in FT-IR. As comparative examples, the AlN powder was heated to 600° C. in the atmosphere instead of the mixed gas of $CH_4$ and $CO_2$ to form the surface layer. Measurements were made in the same manner as that described above in which each powder was subjected to heating for 1 hr at each temperature of 1500° C., 1700° C., 1900° C. in $N_2$ gas, as in the above-mentioned measuring procedure. The results are given in Table 1.

TABLE 1

TABLE 2

| Sample | Mixing solvent | Oxygen amount before mixing (wt %) | Increment of oxygen amt. (wt %) | Sintering temp. (°C.) | Relative Density (%) | Thermal conductivity (W/m · K) | Color tone Color unevenness |
|---|---|---|---|---|---|---|---|
| 1 | EA | 1.60 | 0.20 | 1700 | 99.8 | 160 | good |
| 2 | EA | 1.61 | 0.21 | 1800 | 99.7 | 190 | good |
| 3 | EA | 1.65 | 0.19 | 1900 | 99.9 | 200 | good |
| 4 | EA | 1.20 | 0.20 | 1700 | 99.9 | 170 | good |
| 5 | EA | 1.11 | 0.18 | 1800 | 99.9 | 200 | good |
| 6 | EA | 1.32 | 0.17 | 1900 | 99.8 | 230 | good |
| 7 | EA | 0.95 | 0.16 | 1700 | 99.9 | 195 | good |
| 8 | EA | 0.95 | 0.18 | 1800 | 99.7 | 205 | good |
| 9 | EA | 0.95 | 0.17 | 1900 | 99.9 | 240 | good |
| 10 | EA | 0.50 | 0.15 | 1700 | 99.7 | 226 | good |
| 11 | EA | 0.51 | 0.15 | 1800 | 99.9 | 245 | good |
| 12 | EA | 0.51 | 0.15 | 1900 | 99.8 | 265 | good |
| 13 | water | 0.96 | 0.20 | 1800 | 99.7 | 195 | good |
| 14 | water | 0.94 | 0.21 | 1800 | 99.8 | 210 | good |
| 15 | water | 0.95 | 0.21 | 1900 | 99.9 | 230 | good |
| 16* | EA | 1.87 | 0.31 | 1800 | 95.7 | 120 | poor |
| 17* | water | 1.42 | 29.5 | 1800 | 96.0 | 23 | poor |
| 18* | water | 0.98 | 10.5 | 1800 | 93.0 | 31 | poor |
| 19* | EA | 0.63 | 0.31 | 1800 | 96.0 | 145 | poor |

Note: EA in the Table indicates ethyl alcohol.

| Sample | Grain growth Temp. (°C.) | $CH_4:CO_2$ Mixing ratio (atm) | Increment of oxygen in solid solution (wt %) 1500° C. | 1700° C. | 1900° C. | FT-IR $(cm^{-1})$ |
|---|---|---|---|---|---|---|
| 1 | 1500 | 0.1:0.9 | 0.06 | 0.09 | 0.12 | 685 |
| 2 | 1500 | 0.5:0.5 | 0.04 | 0.06 | 0.09 | 692 |
| 3 | 1500 | 0.0:1.0 | 0.07 | 0.09 | 0.15 | 684 |
| 4 | 1600 | 0.1:0.9 | 0.05 | 0.05 | 0.11 | 689 |
| 5 | 1600 | 0.2:0.8 | 0.03 | 0.04 | 0.09 | 696 |
| 6 | 1600 | 0.5:0.5 | 0.06 | 0.07 | 0.12 | 701 |
| 7 | 1650 | 0.1:0.9 | 0.04 | 0.04 | 0.08 | 691 |
| 8 | 1650 | 0.5:0.5 | 0.03 | 0.03 | 0.09 | 705 |
| 9 | 1650 | 0.0:1.0 | 0.05 | 0.05 | 0.09 | 689 |
| 10 | 1700 | 0.1:0.9 | 0.02 | 0.03 | 0.05 | 693 |
| 11 | 1700 | 0.5:0.5 | 0.02 | 0.03 | 0.04 | 701 |
| 12 | 1700 | 0.9:0.1 | 0.02 | 0.02 | 0.06 | 705 |
| 13 | 1650 | 0.05:0.95 | 0.05 | 0.05 | 0.08 | 686 |
| 14 | 1650 | 0.15:0.85 | 0.03 | 0.03 | 0.07 | 691 |
| 15 | 1650 | 0.25:0.75 | 0.02 | 0.03 | 0.06 | 694 |
| 16* | 1500 | in atmosphere | 0.30 | 0.45 | 0.55 | 720 |
| 17* | 1600 | in atmosphere | 0.20 | 0.25 | 0.31 | 718 |
| 18* | 1650 | in atmosphere | 0.16 | 0.22 | 0.32 | 720 |
| 19* | 1700 | in atmosphere | 0.16 | 0.21 | 0.28 | 720 |

Note: each sample marked with * indicates a comparative example (the same applies hereinbelow).

As can be seen from the results in Table 1, the AlN powder having the surface layer of an aluminum oxynitride at an absorption of 710 to 690 cm$^{-1}$ as measured by FT-IR is remarkably low in the increment of oxygen in solid solution inside the crystal grains as compared with the AlN powder having the surface layer of aluminum oxide in the comparative examples.

To the resultant samples of AlN powder was added $Y_2O_3$ powder with 0.5 μm average particle diameter in a proportion of 1.0% by weight, based on the weight of AlN, under ultrasonic mixing in water or ethyl alcohol as the solvent for 3 hours. The oxygen content was measured of the powder as a whole for each of the AlN powders before and after the mixing to determine the increment of oxygen due to mixing. Thereafter, each of the AlN powders was press molded and sintered at 1700° to 1900° C. in an atmosphere of nitrogen gas. Measurements were made of the relative density and thermal conductivity by laser flashing for each of the sintered samples. The color tone and color unevenness were also examined. The results are given in Table 2.

As can be seen from the results in Table 2, each of the sintered bodies produced from the AlN powder having the surface layer of an aluminum oxynitride according to the present invention exhibits an extremely high thermal conductivity and is minimized in a decrease in thermal conductivity even in the mixing operation by the use of water as the solvent.

EXAMPLE 2

To an AlN powder containing 0.9% by weight of oxygen (dissolution oxygen as solid solution of 0.2% by weight) and 0.1% by weight of impurities other than oxygen were added the compounds containing Mg, Ca, Ba, Ti, V, Cr, Co, Ni, Cu, Ga, Ge, Zr, Nb, Mo, Ru, Hf, Ta, W, Li, B, Si, Y, Sc and a rare earth metal in a proportion of 0.5% by weight, in terms of oxide, based on the weight of the AlN powder and further a pyrolyzable resin in a proportion of 0.3% in terms of carbon, based on the weight of the AlN powder, and the resultant blend was heated at 1400° C. in an atmosphere of nitrogen gas for 1 hour.

The diffusion coefficient of the oxygen atom which diffuses from the surface layer into the crystal grain of AlN powder was determined by the procedure described above for each of the obtained AlN powders having an aluminum oxynitride surface layer, for sample No. 66 on which an aluminum oxynitride surface layer had been formed by heating in the same manner as that described above without adding the compound to the AlN powder and for sample No. 67 comprising the aforesaid AlN powder as such as a comparative example. The results are given in Table 3.

Then, to the resultant samples of AlN powder was added $Y_2O_3$ powder with 0.5 μm average particle diameter in a proportion of 1.5% by weight, based on the weight of the AlN powder, as the sintering aid under ultrasonic mixing for 2 hours. The resultant mixture was molded on a dry press and sintered at 1850° C. in nitrogen gas for 3 hours. Measurements were made of the relative density and thermal conductivity for each of the sintered bodies. The results are given in Table 3. The thickness of the oxynitride layer was 100 Å or smaller for each of the samples (Sample Nos. 20–66).

TABLE 3

| Sample | Added Compd. | Diffusion coefficient D (cm²/s) | Relative Density (%) | Thermal conductivity (W/m·K) |
|---|---|---|---|---|
| 20 | calcium stearate | 1.4E-9exp(−69800/RT) | 99.9 | 235 |
| 21 | calcium acetate | 1.1E-9exp(−69900/RT) | 99.8 | 230 |
| 22 | calcium oxalate | 2.1E-9exp(−72000/RT) | 99.7 | 240 |
| 23 | calcium carbonate | 1.0E-10exp(−68000/RT) | 99.9 | 250 |
| 24 | magnesium nitrate | 5.1E-9exp(−70100/RT) | 99.9 | 200 |
| 25 | magnesium carbonate | 4.1E-9exp(−69900/RT) | 99.5 | 210 |
| 26 | magnesium acetate | 3.9E-9exp(−67100/RT) | 99.8 | 215 |
| 27 | barium carbonate | 1.8E-9exp(−72100/RT) | 99.9 | 200 |
| 28 | titanium stearate | 1.7E-8exp(−81100/RT) | 99.6 | 235 |
| 29 | TiO₂ | 1.4E-9exp(−79100/RT) | 99.9 | 225 |
| 30 | TiO₂ | 1.1E-9exp(−79100/RT) | 99.8 | 245 |
| 31 | Ti coupling agent | 1.1E-10exp(−69100/RT) | 99.7 | 255 |

As the result of analysis by ESCA for each AlN powder, oxygen content in terms of the proportion (3×oxygen amount)/(3×oxygen amount+nitrogen amount) in the aluminum oxynitride of the surface layer in samples Nos. 20 to 66 was in the range of 10 to 75 mol %. The content in sample No. 67 having an oxide surface layer was more than 75 mol %.

EXAMPLE 3

AlN powders having different amounts of oxygen in solid solution inside the crystal grains of AlN as specified in Table 4 were prepared, incorporated with calcium carbonate in a proportion of 0.3% by weight, based on the weight of AlN, and a phenolic resin in a proportion of 0.6% by weight, based on the weight of AlN, for wet mixing in ethyl alcohol and then heated at 1450° C. in an atmosphere of nitrogen gas for 3 hours to convert the oxide layer on the powder surface into the surface layer of an aluminum oxynitride.

As the result of analysis by ESCA for each AlN powder thus obtained, the proportion Al₂O₃/(Al₂O₃+AlN) in the aluminum oxynitride of the surface layer was 13 to 40 mol % for samples Nos. 68 to 72. The AlN powders in samples Nos. 73 and 74 were not subjected to surface modification treatment by heating and the surface thereof was composed of the oxide. Consequently, the above proportion was more than 75 mol %. The position of absorption in FT-IR for each AlN powder is given in Table 4.

Then, to the resultant samples of AlN powder was added, under mixing, Y₂O₃ in a proportion of 1.5% by weight, based on the weight of the AlN powder as the sintering aid. The resultant mixture was press molded and sintered at 1850° C. for 3 hours. Measurements were made of the relative density and thermal conductivity for each of the sintered bodies. The results are given in Table 4.

TABLE 4

| Sample | Oxygen amount in solid soln. in powder (wt %) | Thermal conductivity (W/m·K) | Relative density (%) | FT-IR (cm⁻¹) |
|---|---|---|---|---|
| 68 | 0.19 | 150 | 99.9 | 689 |
| 69 | 0.15 | 195 | 99.8 | 687 |
| 70 | 0.11 | 249 | 99.7 | 684 |
| 71 | 0.05 | 275 | 99.9 | 690 |
| 72* | 0.25 | 135 | 99.9 | 680 |
| 73* | 0.35 | 110 | 99.9 | 681 |
| 74* | 0.25 | 134 | 99.5 | 720 |
| 75* | 0.15 | 146 | 99.9 | 718 |

As can be seen from the above results, when the surface layer is constituted of the oxynitride and the amount of oxygen in solid solution inside the crystal grains of AlN powder is 0.2% by weight or less, a thermal conductivity of 150 W/m·K or higher can be easily attained.

EXAMPLE 4

An AlN powder having an oxygen content of 1.5% by weight, a specific surface area of 15 m²/g, a metallic impurity level of not more than 0.1% by weight and an amount of oxygen in solid solution in the AlN crystal grains of not more than 0.05% by weight was heated to 500° C. in chlorine gas to remove the oxide layer on the surface of the powder, and incorporated with aluminum chloride gas, ammonia gas and nitrogen gas containing moisture (0.01 Torr) to form an aluminum oxynitride layer on the AlN powder. The thickness of the layer was regulated by varying the heating time to be in the range of 5 to 150 Å, wherein the thickness of 150 Å pertains to the comparative example.

Figure 2:
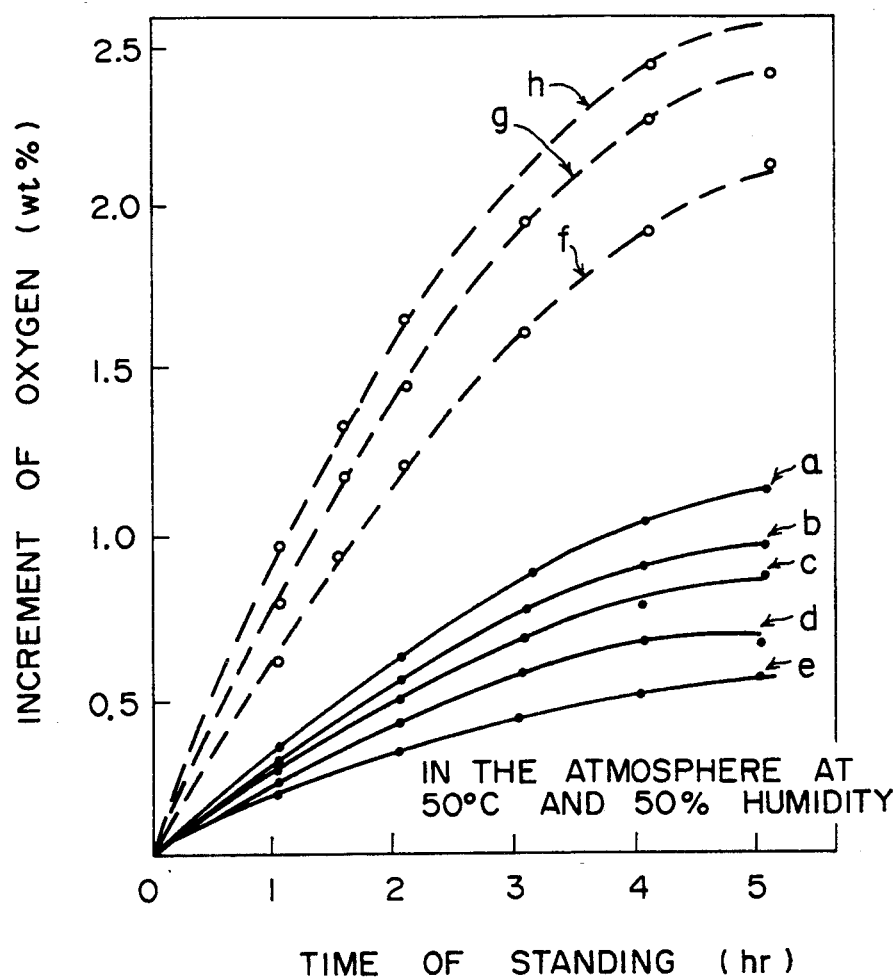
FIG. 2 is a graph showing the relationship between the time of standing and the increment of oxygen when the AlN powder having an oxynitride layer on the surface thereof in Example 4 and the conventional AlN powder having an oxide layer on the surface thereof are each allowed to stand in the atmosphere at 50° C. and 50% humidity.

Thereafter, the resultant AlN powder was allowed to stand in the atmosphere at 50° C. and 50% humidity to measure the increment of oxygen with the result given in FIG. 2. In FIG. 2, curves a, b, c, d, e and f are the results for oxynitride surface layers having 5 Å, 100 Å, 10 Å, 20 Å, 50 Å and 150 Å, in thickness, respectively, in which the curves a, b, c, d and e are for the present invention and the curve f (surface thickness of 150 Å) is for the comparative example. For the purpose of comparison, the AlN powders having oxide layers which had been synthesized by reductive nitriding and direct nitriding respectively, were tested to measure the increment of oxygen in the same manner. The result is given also in FIG. 2 in which curves g and h are the results of the oxide layers synthesized by reductive nitriding and direct nitriding, respectively. The thickness of the surface layer on the powder was measured by a method wherein sampling was made from 5 sites of each powder, 10 particles which typify the sampled powder were selected for each powder, and the thickness was determined by the use of a transmission electron microscope. The data were averaged to adopt the average thickness. Since a correlation was recognized between the average thickness and the signal intensity by Raman spectroscopy for the powder, it is conceivable that the average thickness determined with a transmission electron microscope typifies the thickness of the surface layer on the AlN powder.

The present invention makes it possible to reduce the amount of oxygen which penetrates from the surface layer into the crystal grain of aluminum nitride powder to form solid solution by forming a surface layer containing an oxynitride on the surface of the powder, suppress an increase in oxygen amount by eliminating the occurrence of cracks due to the difference in thermal expansion coefficient between the surface layer and the grain inside and consequently produce an aluminum nitride sintered body having such features as excellent sinterability and favorable thermal conductivity.

What is claimed is:

1. An aluminum nitride powder having a chemically stabilized surface layer containing an oxynitride and having a thickness of 10 to 100 Å, said surface layer containing aluminum oxynitride having an oxygen content of 5 to 75 mol %, in terms of $Al_2O_3/(Al_2O_3+AlN)$, said oxygen content being effective in suppressing the amount of oxygen in solid solution form, said surface layer further preventing formation of microcracks, and suppressing penetration of oxygen into the crystal grains of said aluminum nitride powder.

2. An aluminum nitride powder according to claim 1, wherein the diffusion coefficient D (cm$^2$/s) of the oxygen which diffuses from said surface layer into the crystal grain of the aluminum nitride powder is $8.0 \times 10^{-9} \times \exp(-69100/R \cdot T)$ or lower.

3. The aluminum nitride powder of claim 2 wherein an amount of oxygen in a solid solution inside the crystal grains of said aluminum nitride powder is 0.2%, by weight, or less.

4. An aluminum nitride powder according to claim 1, wherein the amount of the oxygen in the solid solution inside the crystal grains of the aluminum nitride powder is 0.2% by weight or less.

5. An aluminum nitride powder having a chemically stabilized surface layer having a thickness of 10 to 100 Å, said surface layer containing aluminum oxynitride and at least one other oxynitride selected from the group consisting of oxynitrides of Mg, Ca, Ba, Ti, V, Cr, Co, Ni, Cu, Ga, Ge, Zr, Nb, Mo, Ru, Hf, Ta, W, Li, B, Si, Y, Sc, and rare earth elements, said aluminum oxynitride and at least one other oxynitride having a total oxygen content of 10 to 75 mol % in terms of (3 times oxygen content)/(3 times oxygen content plus nitrogen content), said oxygen content being effective in reducing the amount of oxygen in solid solution form, said surface layer further being effective in preventing formation of microcracks and suppressing penetration of oxygen into the crystal grains of said aluminum nitride powder.

6. The aluminum nitride powder of claim 5 wherein a diffusion coefficient D (cm$^2$/s) of the oxygen which diffuses from said surface layer into the crystal grain of said aluminum nitride powder is $8.0 \times 10^{-9} \times \exp(-69100/R \cdot T)$, or less.

7. The aluminum nitride powder of claim 6 wherein an amount of oxygen in a solid solution inside the crystal grains of said aluminum nitride powder is 0.2% by weight, or less.

8. The aluminum nitride powder of claim 5 wherein an amount of oxygen in a solid solution inside the crystal grains of said aluminum nitride powder is 0.2%, by weight, or less.

* * * * *